United States Patent [19]
Stoessel et al.

[11] 3,818,685
[45] June 25, 1974

[54] FORAGE HARVESTER HAVING HEADER MOUNTER FEEDER ROLLS

[75] Inventors: Hermann V. Stoessel; Jack M. Kountz, both of Wichita, Kans.

[73] Assignee: Hesston Corporation, Harvey, Kans.

[22] Filed: Apr. 9, 1073

[21] Appl. No.: 348,980

[52] U.S. Cl. ................................. 56/98, 56/119
[51] Int. Cl. ........................................ A01d 45/02
[58] Field of Search ...................... 56/94, 98, 119

[56] References Cited
UNITED STATES PATENTS
3,127,723  4/1964  Procter et al. .................. 56/119 X
3,654,752  4/1972  Segredo ............................... 56/98

*Primary Examiner*—Russell R. Kinsey
*Assistant Examiner*—J. A. Oliff
*Attorney, Agent, or Firm*—Schmidt, Johnson, Hovey & Williams

[57] ABSTRACT

The detachable header of a forage harvester has crop transfer apparatus in the form of a pair of oppositely driven, vertically spaced apart gripper rolls spanning the discharge throat of the header which receive converging streams of a severed crop from gatherers and grip, feed, and orient the crops through the throat into butt-first delivery to the separate feeder of a chopper on the main frame of the harvester.

7 Claims, 5 Drawing Figures

PATENTED JUN 25 1974

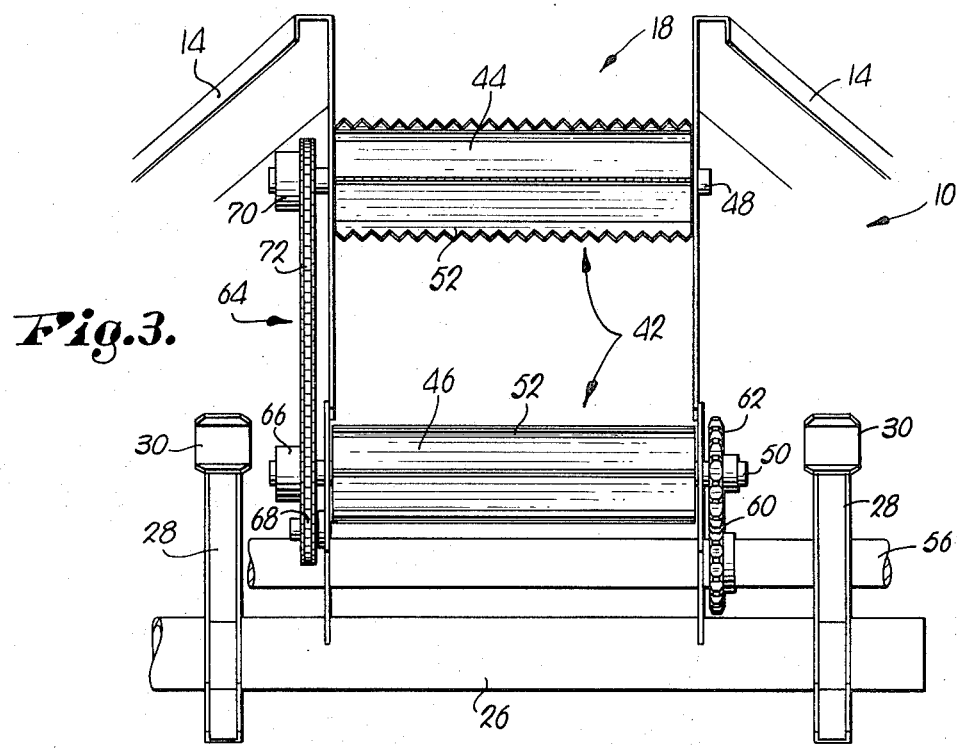
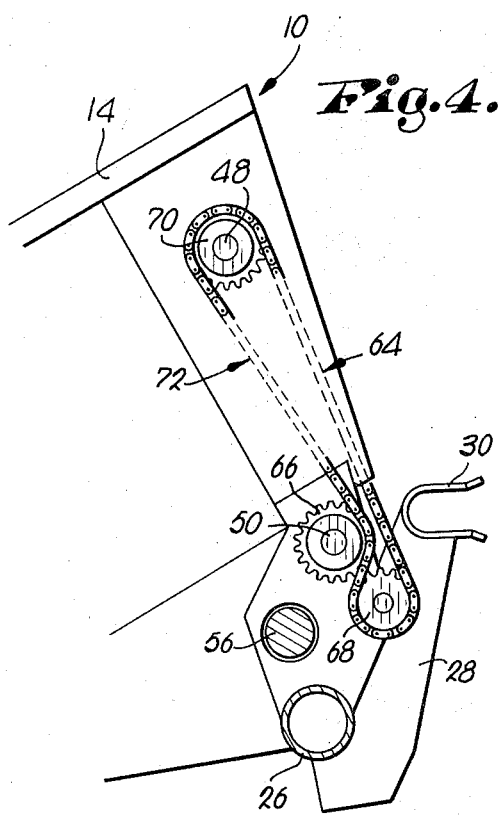
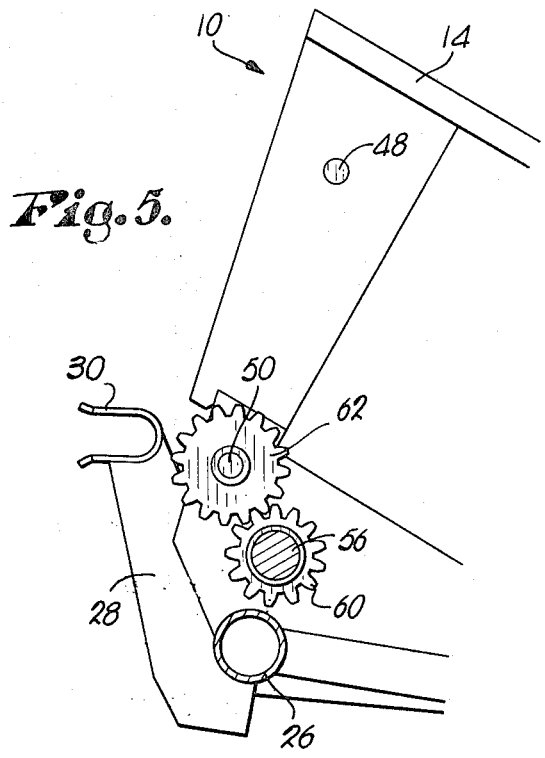

FORAGE HARVESTER HAVING HEADER MOUNTER FEEDER ROLLS

This invention relates to severed crop handling, and particularly to that which occurs during operation of a forage harvester wherein row crops are severed as the harvester advances, are elevated upwardly and rearwardly from the point of severance, and are fed into a chopper for disintegration.

A serious, continuing problem in forage harvesting is controlling the harvested crops at all times throughout severance, elevation, and feeding thereof to the chopper so that the harvesting operation may be carried out smoothly and on a continuous basis without interruptions arising from clogging, jamming, and mechanical failures due to mishandling of the crop. A particular trouble spot is at the throat area of the header of the harvester adjacent the uppermost ends of its gathering chains where widespread, multiple streams of the elevated crops converge and thereafter pass in a single stream through the throat and from the header into the awaiting feeder of the chopper, which is located on the main frame of the harvester. It is at this location, the one most likely to produce clogging, that positive control of the crops is perhaps most desparately needed and yet has been most consistently lacking in harvesting machines heretofore available. In many conventional machines the mechanisms which control the crops after severance, including gathering chains which elevate the crops and overhead guide structures which control the tops of the crops, terminate ahead of the throat area so that the crops are virtually "on their own" upon entering the throat; momentum alone is relied upon to carry them through to the chopper.

By relying solely or in large measure on momentum to carry the crops through the throat, the crops are free to twist and turn out of their orderly procession and to become entangled with one another and with components of the harvester, thus clogging the throat, jamming the gathering chains, and necessitating shutdown of the harvester until the clogged material can be completely cleared.

These problems are compounded by the fact that the header of the harvester, as an attachment to the main frame thereof, places the upper ends of the gathering chains in substantial spaced relationship to the feeder and chopper, both of which are located on the frame itself. Therefore, depending on the size of the harvester, the distance which the crops must be projected without the control of the gathering chains or the feeder can be appreciable and can have a significant, adverse affect on the handling process.

Moreover, the crops must not be projected across the space between the ends of the gathering chains and the feeder in random orientations. Instead, they must be projected in a highly controlled attitude, i.e., butt first, so that the chopper can properly handle the crops without clogging.

Further, because the connection between the header and the frame is usually swingable in nature, the upper end of the header often swings toward and away from the frame when rough terrain is encountered to expand and contract the space between the gathering chains and the feeder, thereby pinching masses of the crops between the header and the frame faster than the crops can be received by the chopper.

Accordingly, the primary object of the present invention is to eliminate the clogging, jamming, maintenance, and loss of time problems aforementioned by positively gripping, feeding, controlling, and orienting the crops from the gathering chains, through the discharge throat, and into the feeder of the chopper.

A further important object of this invention is to provide positive, gripping control of the crops at both their butt and top ends so that neither end of the crop stalks is left free to become entangled with other crops or to become disoriented as the crops pass through the discharge throat.

Another important object of the instant invention is to force the crops toward a horizontal position for butt first delivery as the crops are moved through the throat.

These and other important objects of the present invention will become clear or made apparent from the following description and drawings, wherein:

FIG. 3 is an enlarged, fragmentary, essentially schematic elevational view of the upper discharge end of the header;

FIG. 4 is an enlarged, fragmentary, essentially schematic elevational view of one side of the upper discharge end of the header; and FIG. 5 is a similar view of the opposite side of the upper discharge end of the header.

Figure 1:
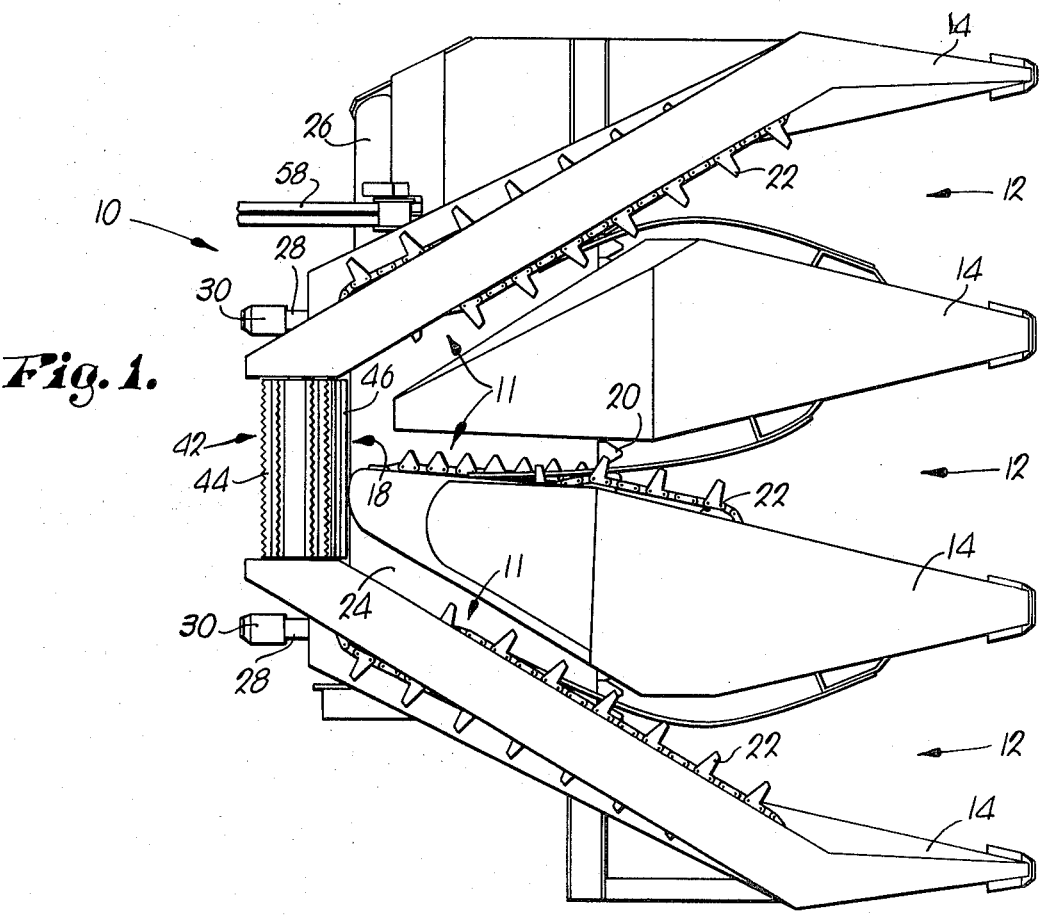
FIG. 1 is a top plan view of a forage harvester header employing crop transfer rolls in accordance with the present invention.

A detached forage harvester header is denoted broadly by the numeral 10 and has a plurality of crop-receiving passages 11 provided with inlet mouths 12 at the forwardmost ends thereof, all defined by laterally spaced-apart fender structures 14 with each mouth 12 being adapted to receive a row of standing crops during advancement of the header 10. The passages 11 defined by fender structures 14 converge rearwardly into a common discharge throat 18 at the uppermost rear end of header 10, the throat 18 being most clearly shown in FIGS. 2 and 3.

A reciprocable sickle 20 common to all passages 11 severs the stalks of a standing crop as the latter is presented to the mouths 12, and multiple levels of gathering chains 22 on opposite sides of each of the passages 11 convey the severed crops upwardly from sickle 20 to the discharge throat 18. An inclined floor 24 underlies the gathering chains 22 and leads from sickle 20 rearwardly to throat 18 for slidably engaging and supporting the butt ends of the severed crops as the latter are elevated in generally upstanding fashion toward throat 18.

The header 10 also has a transversely extending, tubular structural member 26 at the lower rear end thereof having a pair of spaced-apart, upwardly projecting mounting arms 28 thereon, each of which is provided with attachment structure in the nature of a clevis 30 or the like at its uppermost end for securing the header 10 to the main frame 32 (FIG. 2) of the harvester. As further shown in FIG. 2, the harvester frame 32 supports a chopping unit 34 which includes a rotary chopper 36 and a feeder 38 therefor in the nature of a plurality of rotary feed members disposed ahead of chopper 36 for receiving the crops from throat 18 of header 10 and projecting the same into chopper 36 for disintegration thereby.

Located within throat 18 between the upper ends 40 of chains 22 and feeder 38 is crop transfer apparatus 42 in the nature of a pair of oppositely driven, vertically spaced-apart feeder and gripper rolls 44 and 46. The rolls 44 and 46 are mounted for rotation about horizontal axes on shafts 48 and 50 respectively and completely span throat 18 between the outside fender structures 14 as shown best in FIG. 3. Each of the rolls 44 and 46 is polygonal in cross-sectional configuration having crop-engaging protrusions 52 at each corner of the polygon so defined, the upper roll 44 having its protrusions 52 serrated, while those of roll 46 are smooth.

Figure 2:
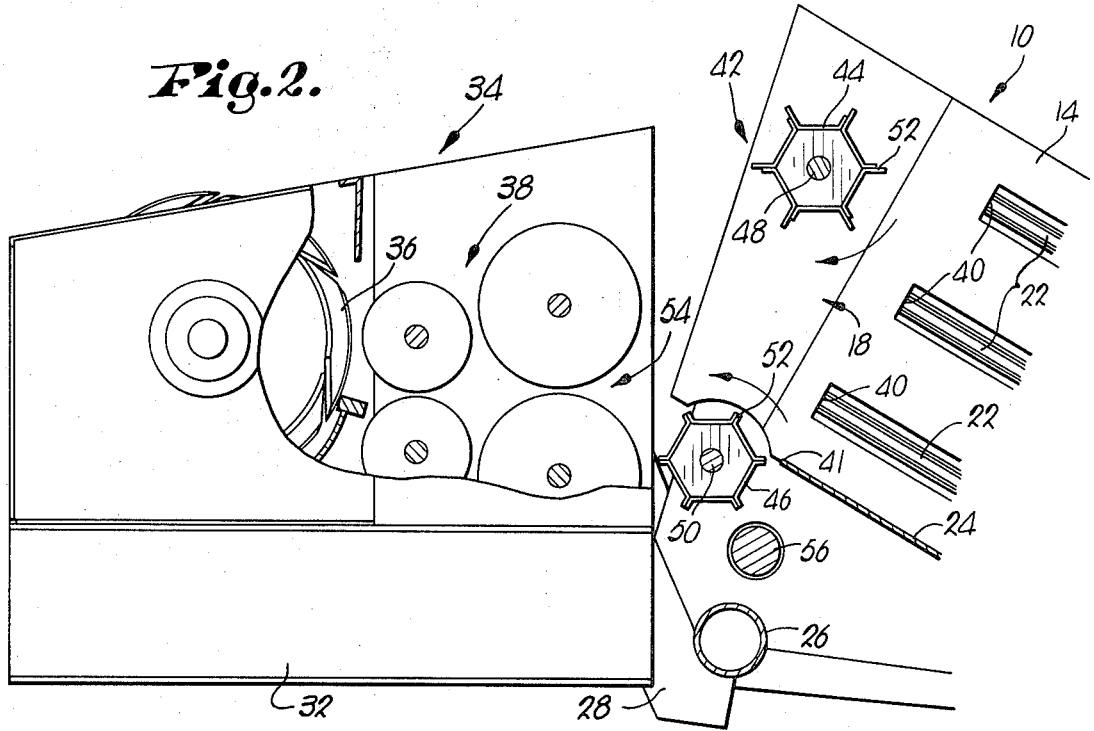
FIG. 2 is an enlarged, fragmentary, essentially schematic, partly cross-sectional and partly elevational view of the header in conjunction with the chopper on the main frame of the harvester.

As shown best in FIG. 2, the lower roll 46 is disposed in close proximity to the upper ends 40 of the lower series of gathering chains 22, to entry 54 of feeder 38, and to the upper extremity 41 of floor 24, the upper periphery projecting slightly above a line extending from the floor extremity 41 to entry 54. The upper roll 44 is disposed at approximately the same level as the ends 40 of the upper series of gathering chains 22 and is mounted in such a position that it is disposed slightly forwardly of the lower roll 46 when header 10 is attached to frame 32 in its normal, downwardly declined condition as shown in FIG. 2.

The rolls 44 and 46 are driven by a common input drive shaft 56 which is operably coupled with a prime mover (not shown) on the main harvester frame 32 by a belt and pulley assembly 58 (FIG. 1). Power is transmitted from shaft 58 to the lower roll 46 by intermeshing gears 60 and 62 (FIGS. 3 and 5) on shafts 56 and 50 respectively at one side of throat 18 to drive roll 46 in a counterclockwise direction viewing FIG. 2. Driving power is supplied to upper roll 44 to drive the same in a clockwise direction, viewing FIG. 2, by a chain and sprocket assembly 64 (FIGS. 3 and 4) on the opposite side of throat 18 which includes a drive sprocket 66 on shaft 50, an idler sprocket 68, a driven sprocket 70 on shaft 48, and a drive chain 72 looped about sprockets 66, 68, and 70 in a manner to drive the shafts 48 and 50 in opposite directions.

In operation, the header 10 is mounted on the frame 32 as above described and as shown in FIG. 2 to dispose the transfer rolls 44 and 46 in the illustrated relationship with entry 54 of feeder 38. It is to be understood that chopper 36 is continuously rotating during advancement of the harvester and, similarly, the feeder 38 is continuously driven in a manner to cause crops fed into entry 54 to be projected rearwardly into chopper 36 for disintegration thereby.

As the severed crops are elevated in upstanding fashion from sickle 20 toward the discharge throat 18, the butts of the crops slide along floor 24 and, because of the inclination of floor 24 in conjunction with the similar inclination of chains 22, the crops are maintained slightly inclined toward the front of header 10 so that the butts slightly lead the tops of the crops. As the crops approach and enter throat 18, their butts leave the upper rear extremity 41 of floor 24 and are driven by the lower roll 46 toward feeder 38. Therefore, not only are the crops precluded from gravitating from header 10 at this point, but they are positively directed and carried into entry 54 for projection by feeder 38 into chopper 36.

The strategic location of roll 46 with respect to floor 24 and entry 54 means that roll 46 functions to some degree as a continuation of floor 24 to prevent downward movement of the crops out of throat 18. At the same time, however, the projection of roll 46 above a line between the upper extremity 41 of floor 24 and entry 54 causes the protrusions 52 on roll 46 to lift and swing the butts toward entry 54 as they leave floor 24, thus helping to orient the crops for the most effective chopping thereof.

The control action of transfer apparatus 42 is, however, much more than merely one of driving the butt ends of the crops toward feeder 38. In addition to this driving and orienting action, a positive gripping of the crops occurs as a result of cooperation of the upper roll 44 with lower roll 46. To this end, rotation of the lower roll 46 in the direction illustrated would normally tend to lift the crops up and away from throat 18 at the same time that they were being advanced toward inlet 54. However, the provision of overhead structure in the form of upper roll 44 causes the application of a retaining force against the crops from above the latter as they are acted on from below by lower roll 46, the two opposing forces thereby operating to effectively grip the crops at the same time they are advanced toward inlet 54.

To a certain extent, the very fact that an overhead obstruction is present, be it rotating structure such as upper roll 44 or stationary structure merely disposed in the path of travel of the advancing crops, means that a controlled gripping action will be effected as the force of the lower roll 46 is opposed by the retaining force of the overhead obstruction. However, such action is magnified considerably by the fact that an overhead obstruction not only exists, it also is rotatably driven in a direction which causes the obstruction (upper roll 44) to apply its own independently created driving and gripping force to the crops as they are moved through throat 18. Therefore, the crops are very positively controlled as they are transferred through throat 18 by rolls 44 and 46, and are allowed little if any freedom to become disoriented and entangled with one another and with adjacent components of the harvester.

The upper roll 44 is important not only for its gripping and counter application of driving force to the crops, but also for its operation as a deflector in forcing the upper margins of the crops downwardly toward a horizontal disposition. This action, coupled with that of the lower roll 46 in swinging the butt ends of the crops toward entry 54, assures that the crops are transferred butt-first into feeder 38 and chopper 36, thus facilitating disintegration of the crops and further decreasing their tendency to clog and jam the harvester.

Moreover, the fact that roll 44 is spaced a substantial distance above lower roll 46 increases the control over the crops inasmuch as manipulating force is applied adjacent both ends of a crop stalk instead of just at the butt end thereof. Further, positioning of upper roll 44 slightly forwardly of lower roll 46 compensates for the inclination of gathering chains 22 and floor 24 so that both rolls 44 and 46 engage the crop at virtually the same time, in spite of forward inclination of the crops by chains 22 and floor 24 during elevation.

It may thus be seen that the crops are very positively controlled within and through throat 18 so that transfer to entry 54 is not left to chance by relying on the momentum of the crops to properly carry them through.

Any tendency of the crops to misalign themselves, clog throat 18, or jam chains 22 is quickly overcome by rolls 44 and 46, as they continuously clear throat 18 and transfer the stalks to feeder 38 with determined guidance. Moreover, the feeder 38 and chopper 36 are not periodically confronted with more material than they can handle because the crops enter entry 54 from rolls 44 and 46 in an orderly single stream at an essentially uniform rate, rather than in spasmotic slugs of twisted, disoriented crops which tend to plug entry 54.

Having thus described the invention what is claimed as new and desired to be secured by Letters Patent is:

1. In a forage harvester having a main frame provided with a chopper and a feeder ahead of the chopper for directing severed row crops butt first into the chopper, an inclined header detachably mounted on said frame ahead of said feeder and including:

means defining a plurality of laterally spaced, crop-receiving passages having inlet mouths adjacent the lower front end of the header;

cutter means for severing crops entering said mouths as the harvester is advanced;

inclined gatherers disposed to elevate the severed crops through said passages toward the upper, rear end of the header along upwardly and rearwardly inclined, laterally converging paths of travel, said gatherers terminating in upper ends spaced forwardly of said upper, rear end of the header;

means defining a common crop discharge throat in the header located between said upper ends of the gatherers and said feeder; and crop transfer apparatus carried by said header for detachment therewith from said frame, said apparatus being a pair of vertically spaced gripper rolls positioned within said throat between the feeder and the upper ends of the gatherers for receiving the severed crops from said gatherers after the latter release the crops into said throat, gripping the crops, deflecting the crops downwardly and forwardly with their severed butt ends facing the feeder, and forcing the crops butt first from said throat into the feeder.

2. In a forage harvester as claimed in claim 1, wherein said apparatus includes a first driven gripper roll across said throat in disposition for forcing the crops by their butts into said feeder and a second gripper roll above said first roll for maintaining the crops in engagement with said first roll.

3. In a forage harvester as claimed in claim 2, wherein said second roll is disposed to deflect the top margins of said crops downwardly as they move through the throat.

4. In a forage harvester as claimed in claim 2, wherein said second roll is driven oppositely to the first roll.

5. In a forage harvester as claimed in claim 4, wherein said second roll is spaced above said first roll in disposition for deflecting the top margins of the crops downwardly as they move through the throat.

6. In a forage harvester as claimed in claim 5, wherein said second roll is mounted on said header in position to be disposed forwardly of said first roll when the header is attached to said frame.

7. In a forage harvester as claimed in claim 2, wherein said header further includes an upwardly and rearwardly inclined floor underlying said gatherers and terminating forwardly of said throat for slidably supporting the butts of the crops during elevation of the latter, said first roll being disposed in close proximity to the upper extremity of said floor for receiving the butts of the crops as they leave said floor.

* * * * *